United States Patent
Bluemel et al.

(10) Patent No.: US 6,329,797 B1
(45) Date of Patent: Dec. 11, 2001

(54) ENERGY SUPPLY DEVICE FOR AN ELECTROMAGNETIC VALVE CONTROL OF AN INTERNAL COMBUSTION ENGINE

(75) Inventors: Roland Bluemel, Plieningen; Christof Gross, Stuttgart, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/359,428

(22) Filed: Jul. 22, 1999

(30) Foreign Application Priority Data

Jul. 22, 1998 (DE) .............................................. 198 32 874

(51) Int. Cl.⁷ .............................. H02P 9/00; H02P 11/00; H02P 9/10; H02P 9/14; H02H 7/06
(52) U.S. Cl. ............................................... 322/28; 322/77
(58) Field of Search .................................. 322/7, 28, 90, 322/77; 320/140, 17; 363/23, 22, 101

(56) References Cited

U.S. PATENT DOCUMENTS

| | | | |
|---|---|---|---|
| 4,073,003 | * | 2/1978 | Chambers ............................. 363/20 |
| 4,131,938 | * | 12/1978 | Milberger et al. .................... 363/101 |
| 4,179,647 | | 12/1979 | Cummins et al. ...................... 320/6 |
| 4,207,512 | * | 6/1980 | Taylor ................................... 320/17 |
| 4,419,618 | * | 12/1983 | Gretsch ................................. 322/90 |

(List continued on next page.)

FOREIGN PATENT DOCUMENTS

| | | |
|---|---|---|
| 684510 | 9/1994 | (CH) . |
| 28 13 988 | 10/1978 | (DE) ................................. H02J/7/14 |
| 2848556 | 8/1987 | (DE) ............................. B60R/16/02 |
| 42 43 936 | 7/1993 | (DE) ................................. H02J/7/14 |
| 42 25 515 A1 | 2/1994 | (DE) ................................. H02J/7/14 |
| 196 46 043 | 5/1998 | (DE) ............................. B60R/16/02 |
| 0 379 357 | 7/1990 | (EP) ................................. H02J/7/14 |
| 0 390 398 B1 | 10/1990 | (EP) ............................. F02M/11/08 |
| 0 391 065 | 10/1990 | (EP) ............................. B60R/16/02 |

OTHER PUBLICATIONS

Patent Abstracts of Japan, Publication No. 07067268 A (Sanyo Electric Co Ltd), dated Mar. 10, 1995.
Patent Abstracts of Japan, E-1256, dated Aug. 31, 1992, vol. 16, No. 412 (Fujitsu Ltd).
Office Action from German Patent Trademark Office dated Nov. 9, 1999.
Copy of European Search Report dated Feb. 1, 2000.
European Search Report, 99112207.8, dated Feb. 1, 2000, with partial English translation.
Von Wolfgang Zeiller, DC/DC–Wandler, Elektor, 9/95, pp. 68–70.

*Primary Examiner*—Nestor Ramirez
*Assistant Examiner*—Julio C. Gonzalez
(74) *Attorney, Agent, or Firm*—Crowell & Moring LLP

(57) ABSTRACT

An energy supply device for an electromagnetic valve control of an internal combustion engine, in particular of a motor vehicle. The supply device has a generator which can be mechanically coupled to the internal combustion engine. A rectifier circuit which is assigned to the generator, has a first diode arrangement, as an anode part, and a second diode arrangement, as a cathode part, and to which a supply output is connected, and an electrical energy store. The electrical energy store is connected to the output of the third diode arrangement, and the energy supply device has a controllable DC/DC converter, which is connected on the one hand to the third diode arrangement and on the other hand to the supply output. As an alternative to the third diode arrangement, the DC/DC converter may be coupled in parallel with a voltage regulator and a diode to the first diode arrangement.

15 Claims, 1 Drawing Sheet

U.S. PATENT DOCUMENTS

| | | | |
|---|---|---|---|
| 4,510,564 | * 4/1985 | Seer, Jr. | 363/23 |
| 4,618,811 | * 10/1986 | Mashino et al. | 322/28 |
| 4,866,585 | * 9/1989 | Das | 363/8 |
| 4,973,896 | * 11/1990 | Shiga et al. | 322/28 |
| 4,992,919 | * 2/1991 | Lee et al. | 363/17 |
| 5,097,165 | 3/1992 | Mashino et al. | 310/112 |
| 5,148,043 | * 9/1992 | Hirata et al. | 307/66 |
| 5,266,882 | * 11/1993 | Morishita | 322/28 |
| 5,341,279 | * 8/1994 | Yamada | 363/21 |
| 5,406,190 | * 4/1995 | Rosenberg | 322/32 |
| 5,491,400 | * 2/1996 | Iwatani et al. | 322/28 |
| 5,512,812 | * 4/1996 | Ono | 322/28 |
| 5,581,451 | * 12/1996 | Ochiai | 363/21 |
| 5,606,244 | * 2/1997 | Migdal | 322/7 |
| 5,783,928 | * 7/1998 | Okamura | 320/122 |
| 5,959,369 | * 9/1999 | Descombes et al. | 307/48 |
| 5,986,436 | * 11/1999 | Liu | 320/140 |
| 6,051,941 | * 4/2000 | Sudhoff et al. | 318/140 |

* cited by examiner

ENERGY SUPPLY DEVICE FOR AN ELECTROMAGNETIC VALVE CONTROL OF AN INTERNAL COMBUSTION ENGINE

BACKGROUND AND SUMMARY OF THE INVENTION

The invention relates to an energy supply device for an electromagnetic valve control of an internal combustion engine.

This application claims the priority of 19,832,874.5, filed Jul. 22, 1998, the disclosures of which is expressly incorporated by reference herein.

Energy supply device serve to feed the electromagnetic valve control of an internal combustion engine of a motor vehicle with electrical energy over the entire speed range, including the starting operation. An electromagnetic valve control requires an approximately fixed operating voltage, consumes high levels of current and has an engine-speed-dependent power requirement of several kilowatts. For the generation of electrical energy in motor vehicles, generators and energy stores, for example batteries, are used. However, the output voltage and power of a generator are speed-dependent. Because the electrical power and voltage provided by the generator and battery generally do not satisfy the requirements of an electromagnetic valve control over all speed ranges, it is expedient to have a special supply circuit between the electromagnetic valve control and the generator, along with the battery.

A generator system including two generators is known from U.S. Pat. No. 5,097,165 which provides supply voltage for consumers of electrical energy in a motor vehicle; virtually speed-independent. A first generator serves for generating a first, lower output voltage. A second generator generates a second, higher output voltage. Each generator is assigned a voltage regulator, by means of which the current in the field windings of the generators is controlled. When the engine is running and there is a changing load, the voltage in both onboard electrical systems can be kept approximately constant.

DE 42 25 515 A1 discloses a device for increasing the generator output voltage in a motor vehicle. The fact that the output lines of the stator winding system of the generator can be switched to earth potential by means of transistors allows the generator output voltage to be briefly increased if required by means of induction voltage pulses.

EP 0 390 398 B1 discloses a starter system for an internal combustion engine which comprises a DC/DC converter for boosting the battery voltage using a storage capacitor. This converter comprises a transformer, the primary winding of which is connected, on the one hand, to the positive terminal of a battery and, on the other hand, via a pulse-triggered transistor switch to earth. The winding ratio of the primary winding and secondary winding is fixed so that the battery voltage is thereby converted from 12 V to 14 V, in order to charge the capacitor initially at the beginning of a starting operation.

The present invention is based on the technical problem of providing an energy supply device for an electromagnetic valve control of a motor vehicle which can be realized with relatively little expenditure and supplies the electromagnetic valve control with electrical energy adequately and effectively over the entire speed range of the internal combustion engine as well as during the starting operation.

According to one aspect of the present invention the energy supply device is parallel to a first diode arrangement, which, as an anode part, lies opposite a second diode arrangement acting as a cathode part. A third diode arrangement is also provided. An electrical energy store is connected to the output of the third diode arrangement. The energy supply device has a controllable DC/DC converter which is connected, on the one hand, to the third diode arrangement and, on the other hand, to the supply output for the electromagnetic valve control.

According to another aspect of the present invention, an energy supply device electrical energy store is connected to the output of the first diode arrangement. The energy supply device has a controllable DC/DC converter which is connected, on the one hand, to the output of the first diode arrangement and, on the other hand, to the supply output for the electromagnetic valve control, a diode being connected parallel to the DC/DC converter. In the present case, apart from actual diode elements, it is possible for POWER-MOS transistors and other semiconductor switches, for example, also to be used as the diode arrangement or diodes.

According to the present invention a fuel-saving energy supply device which provides a stable DC voltage supply for an electromagnetic valve control is provided. By controlling the DC/DC converter, the electromagnetic valve control can be fed electrical energy from the generator and/or the energy store. This makes it possible in ranges of the engine operating map in which disproportionately more fuel is required for generating an excess power for driving the generator or in which the so-called conchoid curve of the generator, which describes its speed-dependent power characteristic, is unfavourable to generate as little electrical energy as possible with the generator and to feed the electromagnetic valve control to the greatest extent from the energy store, which may comprise one or more storage units. Conversely, in ranges of the engine operating map favourable for the generation of electrical energy, i.e. in favourable regions of the conchoid curve of the generator, an excess power can be generated with the generator in order to charge the electrical energy storage unit or units in addition to feeding the electromagnetic valve control. Furthermore, in normal operation, with the DC/DC converter switched off, it is also possible to damp the flow in the engine in order to minimize eddy current losses. Nevertheless, with the DC/DC converter switched on, the electromagnetic valve control can be supplied.

BRIEF DESCRIPTION OF THE DRAWINGS

Other objects, advantages and novel features of the present invention will become apparent from the following detailed description of the invention when considered in conjunction with the accompanying drawings.

Preferred embodiments of the invention are described below and represented in the drawings, in which.

DETAILED DESCRIPTION OF THE DRAWINGS

Figure 1:
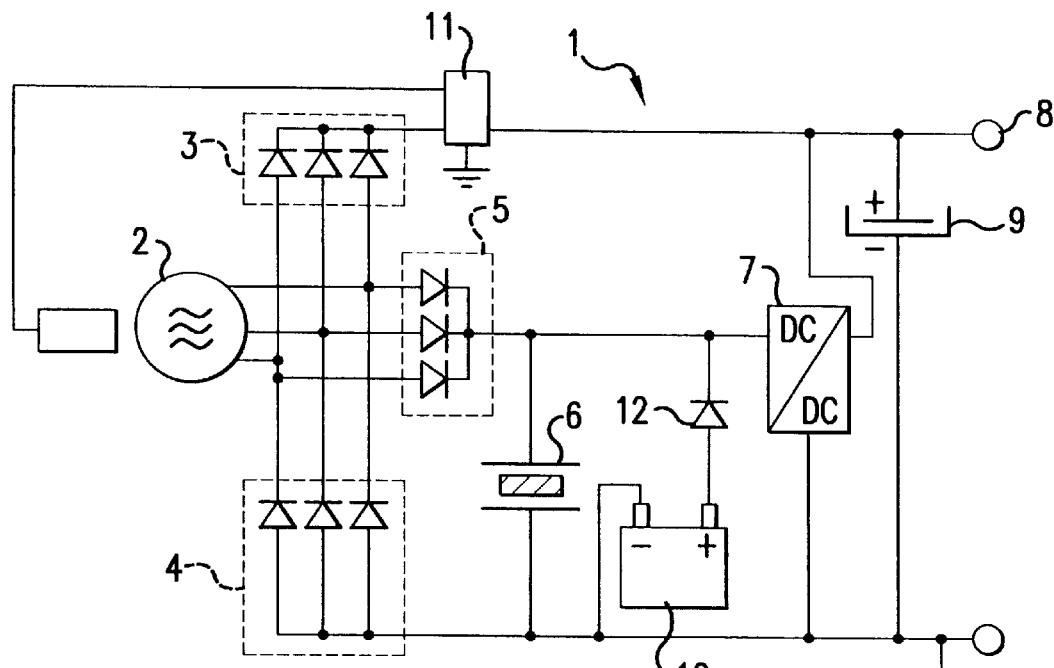
FIG. 1 shows a block diagram of a first embodiment of the energy supply device for an electromagnetic valve control of a motor vehicle and FIG. 2 shows a block diagram of a second embodiment of the energy supply device for an electromagnetic valve control of a motor vehicle.

The energy supply device 1 represented in FIG. 1 comprises a three-phase generator 2, the output voltage of which is rectified by a bridge rectifier circuit in B6U configuration with a first and a second diode arrangement 3 and 4.

A voltage regulator 11 of a conventional type regulates the rectified generator voltage at the output of the first diode arrangement 3 to 40 V and supplies this voltage to a positive output 8 of the energy supply device 1, while the second diode arrangement leads to earth. Connected between the positive output 8 and the earth connection of the energy supply device 1 is a smoothing capacitor 9, through which the pulsed current input is managed and higher harmonics of the AC voltage frequency of the three-phase generator 2, which would otherwise have adverse effects, in particular in the lower speed range of the generator, are damped away. Connected parallel to the first diode arrangement 3 is a third diode arrangement 5 with diodes which are designed for lower currents and which therefore switch through at lower generator voltages than the diodes of the first and second diode arrangements 3 and 4. The output of the third diode arrangement 5 is connected to one side of a controllable DC/DC converter 7. The other side of the DC/DC converter is connected to the line from the voltage regulator 11 to the positive output 8. Additionally connected to the output of the third diode arrangement 5 is a storage capacitor 6. A 12V onboard battery 10 with damping diode 12 is connected parallel to this storage capacitor 6.

When starting the motor vehicle, before actuating a starter of the internal combustion engine, which is likewise fed from the onboard battery 10 and is not represented in FIG. 1, the smoothing capacitor 9 is charged with current from the onboard battery 10 by the DC/DC converter 7 to a starting operating voltage. The starting operating voltage, if required, may lie above the operating voltage of the electromagnetic valve control, with the engine running, of 40V in order to store as much electrical energy as possible in the smoothing capacitor 9. When the smoothing capacitor 9 has reached the starting operating voltage, the starter is actuated and at the same time the electromagnetic valve control is briefly operated with energy from the smoothing capacitor 9. The time shift of the charging of the smoothing capacitor 9 to the starting operating voltage and actuation of the starter has the effect during the starting operation of reducing the current flow from the onboard battery 10. This allows the onboard battery 10 used in the vehicle to be of a smaller overall size.

During idling of the internal combustion engine, the voltage induced in the generator is generally not yet adequate, due to the lower generator speed, to switch through the bridge rectifier circuit comprising the first and second diode arrangements 3, 4. However, some energy can already be taken from the generator by the earlier switched through third diode arrangement 5. The energy supply to the electromagnetic valve control is in this case effected by the voltage of the third diode arrangement 5 and/or the storage capacitor 6 or the onboard battery 10 stepped up by means of the DC/DC converter 7. The DC/DC converter 7 draws current from the generator 2 via the third diode arrangement 5 as soon as the generator voltage is higher than the voltage of the two energy stores 6, 10.

In this case, the DC/DC converter 7 regulates the voltage at the positive output 8 independently of the voltage at the storage capacitor 6 or onboard battery 10 in a speed- or voltage-regulated manner to the desired value of 40V, for example. Moreover, with an adequately high generator voltage, the storage capacitor 6 can be charged from the generator 2 via the third diode arrangement 5, the onboard battery 10 thereby being protected against overvoltages by the damping diode 12.

When the engine speed increases and has reached a certain operating speed, the generator voltage is sufficient for also switching through the diodes in the first and second diode arrangements 3 and 4. After reaching a cutoff speed, the DC/DC converter 7 can be cut out, so that the electromagnetic valve control is fed via the first and second diode arrangements 3 and 4 alone, along with the voltage regulator 11. By controlling the DC/DC converter 7 as a function of the voltage at the positive output 8 of the energy supply device 1 or the engine speed, a good compensation of voltage fluctuations at the positive output 8 for the electromagnetic valve control is effected over a broad speed range due to the better dynamic behaviour of a DC/DC converter in comparison with an uncontrolled voltage regulator.

To save weight, it may be advantageous to dimension the three-phase generator 2 as small as possible. If, in this case, the power of the generator 2 in the uppermost speed range is no longer adequate to cover the speed-dependently linearly increasing power requirement of the electromagnetic valve control, current for the electromagnetic valve control can be additionally supplied from the onboard battery 10 or the storage capacitor 6 via the controllable DC/DC converter 7, which prevents the voltage from breaking down at the positive output 8 of the electromagnetic energy supply device.

If the energy supply device 1 is used in a motor vehicle, it can accomplish a braking energy recovery by the generator 2 charging the storage capacitor 6. In this case, the storage capacitor 6 is charged via the third diode arrangement 5, equipped for example with controllable semiconductor valves, such as thyristors. In the case of a preferred bidirectional configuration of the DC/DC converter 7, charging from the supply circuit for the positive connection 8 of the electromagnetic valve control is also possible. The diode 12 may in this case expediently be replaced by an MOS synchronization rectifier.

The stored braking energy may then subsequently be used again directly via the DC/DC converter 7, in order to feed the electromagnetic valve control alone or in a supporting manner. If the braking energy from the storage capacitor 6 is used, the generator 2 is loaded correspondingly less. Due to the high power requirements of an electromagnetic valve control, in the range of some kilowatts, the storage capacitor 6 is discharged relatively quickly after ending the braking operation and is then ready to receive again in the case of a braking operation only a short time thereafter. This recovery of energy allows fuel to be saved, because the generator is loaded less on average during normal operation and correspondingly lower counter-torque is induced on the internal combustion engine.

It is advantageous to control the DC/DC converter 7 in a manner dependent on the engine and generator operating maps. In speed ranges in which the internal combustion engine is operating with unfavourable efficiency, in other words operating fuel-intensively, the DC/DC converter 7 is controlled such that energy is fed at least in a supporting manner from the storage capacitor 6 or the onboard battery 10 into the supply circuit for the positive connection 8. Due to the lower loading of the generator, this produces an effect wherein the counter-torque which it induces at the internal combustion engine is reduced. Conversely, in speed ranges in which the internal combustion engine is operating with good efficiency, in other words fuel-economically, the DC/DC converter 7 is controlled such that the storage capacitor 6 does not feed any additional energy into the supply circuit for the positive connection 8 and, instead, is charged via the third diode arrangement 5 to the DC/DC converter. In this way, fuel-economically generated energy is stored and can be fed at a later time to the electromagnetic valve control. If the DC/DC converter 7 is of a bidirectional configuration, it is also possible, as mentioned, to feed the storage capacitor 6 via the supply circuit for the positive connection 8.

It is also possible for energy generation to load the generator 2 in a manner dependent on its conchoid power curve. For this purpose, in speed ranges in which the generator 2 is able to generate electrical energy with high efficiency, more current is drawn from it than the electromagnetic valve control consumes. The excess energy is stored in the storage capacitor 6. It is then possible to resort to this energy in speed ranges of the generator 2 in which the latter has a lower efficiency. A correspondingly lower loading of the generator 2 or even shutting down of the same has the effect of correspondingly reducing its counter-torque on the internal combustion engine.

Figure 2:
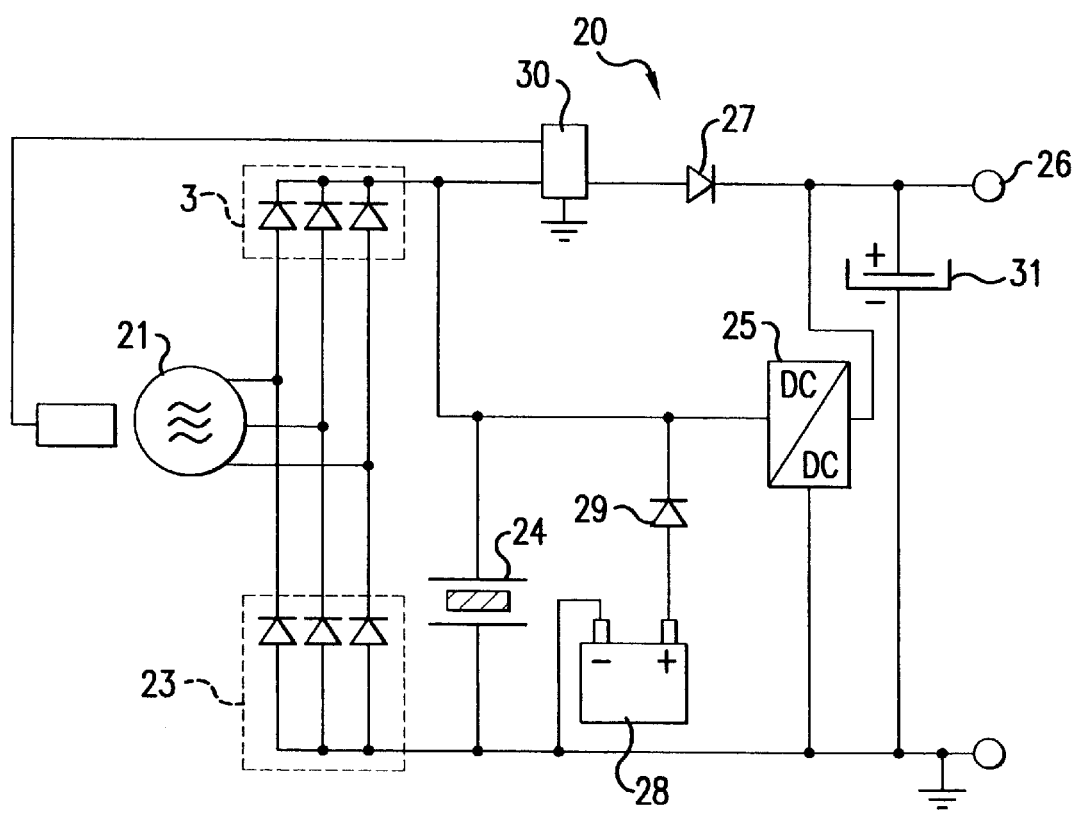

The energy supply device 20 illustrated in FIG. 2 for an electromagnetic valve control of a motor vehicle comprises a three-phase generator 21, the output voltage of which is rectified by means of a first and a second diode arrangement 22 and 23, which form a bridge rectifier circuit in B6U configuration. Coupled to this bridge rectifier circuit in parallel are a storage capacitor 24 and a 12V onboard battery 28 with damping diode 29. The voltage at the positive output 26 of the energy supply device 20 is fixed at, for example, 40V by a first side of a controllable DC/DC converter 25. On its other side, the DC/DC converter is connected to the first diode arrangement 22. Parallel to the DC/DC converter 25 there lies in the current path from the first diode arrangement 22 to the positive connection 26 an uncontrolled voltage regulator 30 and a diode 27. As in the case of the energy supply device represented in FIG. 1, a smoothing capacitor 31 is provided for damping modulated-on AC voltages between the positive connection 26 and the earth connection of the energy supply device 20.

For starting the motor vehicle, the energy supply device 20 can be operated in a way corresponding to the energy supply device 1 of FIG. 1. Consequently, during idling of the engine, when the generator voltage is not yet adequate to switch through the diodes in the diode arrangements 22 and 23, the electromagnetic valve control is fed with electrical energy from the storage capacitor 24 and/or the onboard battery 28, which is converted by the DC/DC converter 25 to the voltage required by the electromagnetic valve control.

When the generator voltage is adequate to switch through the diodes in the diode arrangements 22 and 23, the electromagnetic valve control can be fed directly from the generator. In this case, if the power requirement of the electromagnetic valve control exceeds the generator power, down of the voltage at the positive connection 26 of the energy supply device 20 is prevented by supplying electrical energy from the storage capacitor 24 or the battery 28 via the controllable DC/DC converter 25.

As in the case of the energy supply device 1 described in FIG. 1, the DC/DC converter 25 counteracts voltage fluctuations originating from the voltage regulator 30 in a compensating manner when it adjusts in a speed- or voltage-regulated manner a desired voltage at the positive output 26 of the energy supply device 20. In a way corresponding to the energy supply device 1 from FIG. 1, it is also possible at high speeds, if the power required by the electromagnetic valve control exceeds the power capacity of the generator 21, to feed current via the controllable DC/DC converter 25 into the supply circuit for the positive connection 26. Braking energy can also be stored in the storage capacitor 24 or the latter can be charged in a manner dependent on the engine operating map or conchoid curve, as was explained with reference to FIG. 1.

It should be noted that, in the case of the two energy supply devices 1 and 20 represented in FIGS. 1 and 2 for an electromagnetic valve control, a generator failure does not have to result in a failure of the electromagnetic valve control, because the latter can indeed also be fed from the battery 10 or 28 or the storage capacitor 6 or 24. It is also possible in the case of both forms of the energy supply device 1 and 20 to integrate the function of the battery damping diodes 12 and 29 into the DC/DC converter 7 and 25, respectively, so that not only the storage capacitor 6 or 24, but also the battery 10 or 28 is charged by the said converter during braking operations.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An energy supply device for an electromagnetic valve control of an internal combustion engine comprising:
   a generator mechanically coupled to the internal combustion engine;
   a rectifier circuit connected to receive an output of the generator, said rectifier circuit comprising a first diode arrangement arranged as an anode part, and a second diode arrangement arranged as a cathode part, and to which a supply output is connected;
   an electrical energy store connected to an output of a third diode arrangement, which forms a second anode part and is also connected parallel to the first diode arrangement, wherein the diodes of the third diode arrangement conduct at lower conducting-state voltages than the diodes of the first diode arrangement, and
   a controllable DC/DC converter which is connected to the output of the third diode arrangement and to the supply output.

2. An energy supply device according to claim 1, wherein a voltage regulator is connected to an output of the diodes of the first diode arrangement.

3. An energy supply device for an electromagnetic valve control of an internal combustion engine, comprising: a generator mechanically coupled to the internal combustion engine;
   a rectifier circuit connected to an output of the generator, comprising a first diode arrangement, as an anode part, and a second diode arrangement, as a cathode part, and to which a supply output is connected; and
   an electrical energy store connected to the output of the first diode arrangement;
   a controllable DC/DC converter which is connected in parallel with the energy store and is connected to the output of the first diode arrangement and to the supply output; and
   a diode connected parallel to the DC/DC converter.

4. An energy supply device according to claim 3, wherein the diode, together with a voltage regulator connected between said first diode arrangement and said diode, is connected parallel to the DC/DC converter.

5. An energy supply device according to claim 1, wherein the energy store is formed by a battery and a storage capacitor, which are connected in parallel.

6. An energy supply device according to claim 5, wherein an anode of the battery is protected by means of a damping diode.

7. An energy supply device according to claim 1, wherein the DC/DC converter is bi-directional and is operated to feed energy from the energy store to the supply output in operating phases with inadequate generator power and feeding energy back into the energy store in operating phases with excessive generator power.

8. An energy supply device according to claim 1, wherein a voltage regulator is connected to an output of the diodes of the first diode arrangement.

9. An energy supply device according to claim 1, wherein the energy store is formed by a battery and a storage capacitor, which are connected in parallel.

10. An energy supply device according to claim 2, wherein the energy store is formed by a battery and a storage capacitor, which are connected in parallel.

11. An energy supply device according to claim 3, wherein the energy store is formed by a battery and a storage capacitor, which are connected in parallel.

12. An energy supply device according to claim 4, wherein the energy store is formed by a battery and a storage capacitor, which are connected in parallel.

13. An energy supply device according to claim 3, wherein the DC/DC converter is bi-directional and can be operated to feed energy from the energy store to the supply output in operating phases with inadequate generator power and feeding energy back into the energy store in operating phases with excessive generator power.

14. A system for supplying a required electrical current flow to a valve control unit of an internal combustion engine over a range of engine operating speeds, comprising:

a generator mechanically coupled to the internal combustion engine;

a rectifier circuit connected to the generator, the rectifier circuit comprising a first diode arrangement which functions as an anode, and a second diode arrangement which functions as a cathode;

a third diode arrangement which functions as a second anode and is connected in parallel with the first diode arrangement with respect to a current supply output wherein the diodes of the third diode arrangement conduct at lower conducting-state voltages than the diodes of the first diode arrangement, an electrical energy storage device connected to an output of the third diode arrangement; and a controllable DC/DC converter connected to the third diode arrangement and the current supply output.

15. A method for supplying an electrical current flow to a valve control of an internal combustion engine over a range of engine operating speeds, comprising:

arranging at least two energy providing devices so as to selectively supply the electrical current flow to the valve control, wherein one of the at least two energy providing devices is a generator;

supplying a first low voltage electrical current flow to the valve control from at least one of the at least two energy providing devices other than the generator during start up of the internal combustion engine;

monitoring induced electrical current in the generator to determine when a desired second high voltage electrical current flow is reached to operate the valve control during normal engine operation while supplying at least a portion of the induced electrical current to the first low voltage electrical current flow; and stopping supply of the first lower voltage electrical current flow to the valve control when the desired second higher voltage electrical current flow from the generator has been reached, and simultaneously switching from the first lower voltage electrical current flow to the second higher voltage electrical current flow to operate the control valve during normal engine operation.

\* \* \* \* \*